US010253250B2

(12) United States Patent
Nguyen et al.

(10) Patent No.: US 10,253,250 B2
(45) Date of Patent: Apr. 9, 2019

(54) FORMING CONDUCTIVE ARCH CHANNELS IN SUBTERRANEAN FORMATION FRACTURES

(71) Applicant: Halliburton Energy Services, Inc., Houston, TX (US)

(72) Inventors: Philip D. Nguyen, Houston, TX (US); Walter T. Stephens, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/562,406

(22) PCT Filed: Apr. 28, 2015

(86) PCT No.: PCT/US2015/028038
§ 371 (c)(1),
(2) Date: Sep. 27, 2017

(87) PCT Pub. No.: WO2016/175765
PCT Pub. Date: Nov. 3, 2016

(65) Prior Publication Data
US 2018/0051203 A1    Feb. 22, 2018

(51) Int. Cl.
*E21B 43/267* (2006.01)
*C09K 8/80* (2006.01)
(Continued)

(52) U.S. Cl.
CPC ............... *C09K 8/805* (2013.01); *C09K 8/56* (2013.01); *C09K 8/62* (2013.01); *C09K 8/80* (2013.01); *E21B 43/267* (2013.01)

(58) Field of Classification Search
CPC ...... E21B 43/267; E21B 21/003; E21B 43/04; E21B 43/26; C09K 8/80; C09K 8/62; C09K 8/805; C09K 2208/18
See application file for complete search history.

(56) References Cited

U.S. PATENT DOCUMENTS 7,255,168 B2    8/2007 Nguyen et al.
7,281,580 B2   10/2007 Parker et al.
(Continued)

FOREIGN PATENT DOCUMENTS

EP    2469020 A1    6/2012

OTHER PUBLICATIONS

D. Mader, "Hydraulic Proppant Fracturing and Gravel Packing", Elsevier Science Publishers B.V., 1989, ISBN 0-444-87352-x (vol. 26) pp. 379-381.
(Continued)

*Primary Examiner* — Zakiya W Bates
(74) *Attorney, Agent, or Firm* — McGuireWoods LLP

(57) ABSTRACT

Methods including introducing a pad fluid into a subterranean formation to create or enhance an open fracture at a first treatment interval therein; introducing a treatment fluid into the fracture, wherein the treatment fluid comprises a second base fluid, crushable-proppant particulates (CPPs), and buoyant-proppant particulates (BPPs), and wherein a first specific gravity of the CPPs is at least about 0.3 greater than a second specific gravity of the BPPs; placing the CPPs and the BPPs in the fracture, wherein the CPPs settle to a bottom portion of the fracture and the BPPs neutrally suspend in the treatment fluid in a top portion of the fracture; and reducing the hydraulic pressure, thereby permitting the fracture to close, wherein the CPPs form a crushed-proppant pack in the bottom portion of the fracture and the BPPs form a proppant pack in the top portion of the fracture, thereby forming an arch channel therebetween.

19 Claims, 3 Drawing Sheets

(51) Int. Cl.
*C09K 8/62* (2006.01)
*C09K 8/56* (2006.01)

(56) References Cited

U.S. PATENT DOCUMENTS

| | | |
|---|---|---|
| 7,281,581 B2 | 10/2007 | Nguyen et al. |
| 7,581,590 B2 | 9/2009 | Lesko et al. |
| 7,918,277 B2 | 4/2011 | Brannon et al. |
| 8,088,718 B2 | 1/2012 | Bicerano et al. |
| 8,109,336 B2 | 2/2012 | Wheeler et al. |
| 8,127,850 B2 | 3/2012 | Brannon et al. |
| 8,584,755 B2 | 11/2013 | Willberg et al. |
| 8,727,003 B2 | 5/2014 | Li et al. |
| 2006/0151170 A1* | 7/2006 | Brannon .................. C09K 8/80 166/280.2 |
| 2008/0271889 A1 | 11/2008 | Misselbrook et al. |
| 2013/0014946 A1 | 1/2013 | Makarychev-Mikhailov et al. |
| 2013/0146288 A1 | 6/2013 | Smith et al. |
| 2015/0083420 A1* | 3/2015 | Gupta .................. E21B 43/267 166/280.2 |

OTHER PUBLICATIONS

Mayerhofer et al., "Waterfracs—Results from 50 Cotton Valley Wells," 1998 SPE Annual Technical Conference and Exhibition, Sep. 1998, SPE 49104.

Warpinski et al., "Stimulating Unconventional Reservoirs: Maximizing Network Growth While Optimizing Fracture Conductivity," 2008 SPE Unconventional Reservoirs Conference, Feb. 2008, SPE 114173, 19 pages.

Warpinski, "Stress Amplification and Arch Dimensions in Proppant Beds Deposited by Waterfracs," SPE Production and Operations, Nov. 2010, vol. 25, No. 4, SPE 119350.

Woodworth et al., "Extrapolation of Laboratory Proppant Placement Behavior to the Field in Slickwater Fracturing Applications," 2007 SPE Hydraulic Fracturing Technology Conference, Jan. 2007, SPE 10689.

International Search Report and Written Opinion from International Application No. PCT/US2015/028038 dated Jan. 15, 2016.

* cited by examiner

FORMING CONDUCTIVE ARCH CHANNELS IN SUBTERRANEAN FORMATION FRACTURES

BACKGROUND

The embodiments herein relate generally to subterranean formation operations and, more particularly, to forming conductive arch channels in subterranean formation fractures.

Hydrocarbon producing wells (e.g., oil producing wells, gas producing wells, and the like) are often stimulated by hydraulic fracturing treatments. In traditional hydraulic fracturing treatments, a treatment fluid, sometimes called a carrier fluid in cases where the treatment fluid carries particulates entrained therein, is pumped into a portion of a subterranean formation (which may also be referred to herein simply as a "formation") above a fracture gradient sufficient to break down the formation and create one or more fractures therein. The term "treatment fluid," as used herein, refers generally to any fluid that may be used in a subterranean application in conjunction with a desired function and/or for a desired purpose. The term "treatment fluid" does not imply any particular action by the fluid or any component thereof. As used herein, the term "fracture gradient" refers to a pressure (e.g., flow rate) necessary to create or enhance at least one fracture in a subterranean formation.

Typically, particulate solids, such as graded sand, are suspended in a portion of the treatment fluid and then deposited into the fractures. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. The term "proppant pack" generally refers to a collection of proppant particulates in a fracture. The degree of success of a stimulation operation depends, at least in part, upon the ability of the proppant pack to permit the flow of fluids through the interconnected interstitial spaces between proppant particulates.

One technique to increase the conductivity of a fracture involves placing a much reduced volume of proppants in a fracture in order to create a high porosity fracture. In such operations, the proppant particulates within the fracture may be widely spaced but still present in an amount sufficient to hold the fracture open and allow for production fluids to flow. An increased fracture conductivity may result due to the fact that the produced fluids may flow around widely spaced proppant rather than through the relatively small interstitial spaces in a proppant pack.

Proppant settling may occur when forming such proppant packs or widely spaced proppant particulates within a fracture. Low-viscosity fluids may be particularly susceptible to such settling, where proppant particulates settle out and quickly form a dune at a bottom portion of a fracture. Once such settling occurs, an arch may be formed on top of the fracture bed that does not comprise proppant due to fracture closure stresses.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
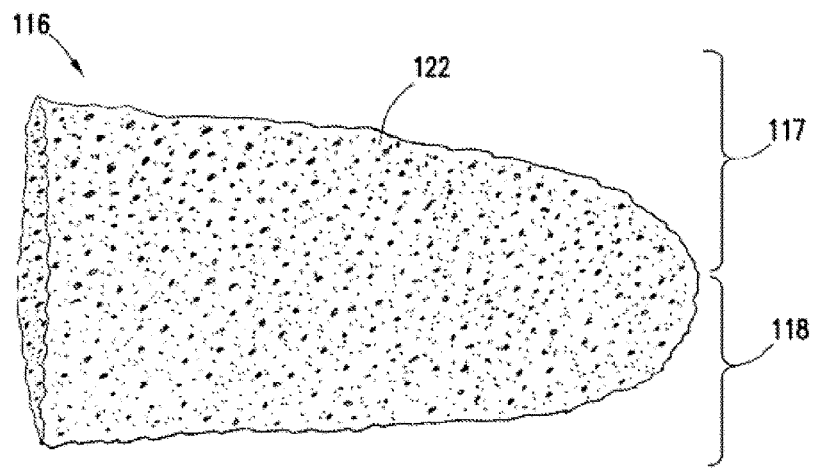
FIGS. 1A and 1B depict a side view of a fracture employing one or more embodiments of the present disclosure.

The embodiments herein relate generally to subterranean formation operations and, more particularly, to forming conductive arch channels in subterranean formation fractures.

In the oil and gas industry, a subterranean formation or portion thereof containing oil or gas is referred to as a "reservoir." A reservoir may be located under land or offshore beneath a body of water. Reservoirs are typically located in the range of a few hundred feet (shallow reservoirs) to tens of thousands of feet (ultra-deep reservoirs). In order to produce oil or gas, a wellbore is drilled into a reservoir or adjacent to a reservoir. The oil, gas, or water produced from the wellbore is referred to herein as "produced fluid."

As used herein, the term "fluid" refers to any substance having a continuous phase that tends to flow and to conform to the outline of its container when the substance is tested at a temperature of about 71° F. (equivalent to about 22° C.) and a pressure of about 1 atmosphere (atm) (equivalent to 0.1 megapascals (MPa)). As used herein, the term "fluid" refers to substances in a liquid phase or a gaseous phase. A homogenous fluid has only one phase, whereas a heterogeneous fluid has more than one distinct phase. A heterogeneous fluid can be a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; a mist, which includes an external gas phase and liquid droplets as the internal phase; and the like.

As used herein, a "wellbore," which may be used interchangeably with "well," refers to a drilled hole or borehole, including any cased and/or uncased portion or entirety thereof, in a subterranean formation. A wellbore may be have portions or an entirety thereof that is vertical, inclined, and horizontal, and it may be straight, curved, or branched. As used herein, the terms "into a subterranean formation," which may be used interchangeably with "into a wellbore," includes into any portion of a subterranean formation, including into a wellbore or the near-wellbore region thereof. As used herein, the term "near-wellbore region" refers to the subterranean material and rock of the subterranean formation surrounding a wellbore. Typically, the near-wellbore region is considered the region within approximately 100 feet radially of the wellbore.

After a wellbore is drilled, it may often be necessary to create or enhance at least one fracture the subterranean formation to facilitate hydrocarbon production. Creating a fracture means making a new fracture in the formation, and enhancing a fracture means enlarging in any trajectory or direction (e.g., length, width, and the like) a pre-existing fracture in the formation. As used herein, the term "fracture"

means the creation or enhancement of a natural or manmade fracture within a subterranean formation. As used herein, the term "face" of a fracture refers to the surfaces of a formation exposed to fluid (e.g., a pad fluid, a treatment fluid, and the like) once a fracture is created. Further, it is often desirable to fracture at more than one downhole location. These fractures may be kept open after removal of hydraulic pressure by inclusion of proppant particulates, to allow produced fluids to flow from the subterranean formation and into the wellbore for collection via the fracture.

The subterranean formation will exert a force or pressure on the proppant located within the fracture. This is known as the "closure stress" of the formation or fracture. Pressures from the subterranean formation on the proppant located in the fractures can be as high as 10,000 to 15,000 or more pounds force per square inch (psi). Depending on the type, size, and design of the proppant particulates, such closure stresses may result in crushing the proppant, such that a portion or the entirety of the fracture may close and no longer function. This same fracture closure event may occur when the proppant particulates settle to only a portion of the fracture, allowing the unoccupied-proppant portion to fully close and the occupied-proppant portion to crush such that permeability is significantly reduced or shut off.

The embodiments of the present disclosure use the natural phenomenon of proppant settling, in combination with comparatively buoyant proppant particulates advantageously to form an arch channel between the two types of proppant particulates in a fracture. Generally, the settled proppant moves to the bottom of the fracture and the comparatively buoyant proppant particulates remain in a top portion of the fracture, thereby forming a highly conductive arch channel therebetween. As used herein, the term "arch channel" refers to a void channel (substantially proppant-free or solids-free) formed by the effect of wedging caused by the proppant particulates settled at the bottom portion of a closing fracture. The arch channel is formed due to the stiffness of the fracture faces under closure stress on top of the settled proppant particulates, which may be in the shape of a dune (i.e., a mound). The arch channel void space may provide an effective permeability of several thousands, or several hundreds of thousands darcies. The settled proppant particulates at the bottom portion of the fracture additionally have a decreased permeability compared to that of the comparatively buoyant proppant particulates in the top portion of the fracture. The settled proppant particulates bear the stress load of the local fracture closure such that the arch channel is formed between in the closed fracture between the settled proppant particulates and the buoyant proppant particulates in the top portion of the fracture. In some instances, as discussed in detail below, the settled proppant particulates have little or no permeability in the bottom portion of the fracture due to their crushing under closure stress, which holds much of the pressure of the closure stress, protecting the comparatively buoyant proppant particulates from crushing and from migrating into the arch channel. The settled proppant particulates may have a permeability of no more than a few hundred darcies, for example. Accordingly, the embodiments described herein increase conductivity and/or the conductive life of the fracture.

Advantages of the present disclosure include increasing conductivity and/or the conductive life of a fracture in a subterranean formation with the use of low-quality, readily-available, and inexpensive proppant particulates (e.g., low-quality sand); eliminating the use of injection pulsing or pumping which can be particularly taxing on such equipment, often reducing the useful life thereof; reducing gelling agent amounts typically required to maintain proppant particulates in suspension (as the present disclosure uses their natural tendency to settle); and reducing the amount of water required for use in a treatment fluid.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses+/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a method of introducing a pad fluid into a subterranean formation at a hydraulic pressure sufficient to create or enhance an open fracture at a first treatment interval therein. That is, the pad fluid is introduced into the formation at a rate and pressure at or above the fracture gradient of the particular formation being treated. The pad fluid comprises a first base fluid and optionally a gelling agent. The pad fluid is a solids-free fluid, meaning that intentional inclusion of solids material is not in the pad fluid, although some solid material may enter into the pad fluid, without departing from the scope of the present disclosure. For example, the pad fluid may naturally pick up solid formation fines upon its introduction into the subterranean formation, or may pick up solids during its pumping from certain pumping equipment or residual fluids.

Thereafter, a treatment fluid is introduced into the fracture. The treatment fluid comprises a second base fluid, crushable-proppant particulates (CPPs), and buoyant-proppant particulates (BPPs). The CPPs have a first specific gravity and the BPPs have a second specific gravity, wherein the first specific gravity of the CPPs is at least about 0.3 greater than the second specific gravity of the BPPs. The specific gravity is measured with reference to water in accordance with American Petroleum Institute Recommended Practice 19C:2008 (API RP 19C). The CPPs and BPPs are placed into the fracture from the treatment fluid, wherein due to the specific gravity variation therebetween, the CPPs settle to a bottom portion of the fracture and the BPPs neutrally suspend in the treatment fluid in a top portion of the fracture.

In some embodiments, the BPPs and the CPPs may be introduced separately into the fracture. For example, a tubular (e.g., coiled tubing) may be used to introduce the a treatment fluid comprising a base fluid and the BPPs or CPPs through the interior of the tubular, and another treatment fluid comprising a base fluid and the other of the BPPs or CPPs may be introduced into the fracture through an annulus formed between the wellbore and the exterior of the tubular. Such introduction may permit the separation of the BPPs and the CPPs until there are placed into the fracture, such as to prevent certain additives from mixing or to facilitate storage requirements, for example.

The hydraulic pressure is then released to permit the fracture to close, thereby crushing the CPPs due to the fracture closure stress and forming a crushed-proppant pack in the bottom portion of the fracture with the CPPs, a proppant pack in the top portion of the fracture with the BPPs, and an arch channel therebetween. As used herein, the term "crushed-proppant pack" with reference to the CPPs described herein refers to proppant pack bed filled with a plurality of layers of proppant particulates, and which comprises crushed proppant particulate fines that tend to fill the pore spaces therebetween. As used herein, the term "proppant pack" with reference to the BPPs described herein refers to a proppant pack bed filled with a plurality of layers of proppant particulates in which the individual proppant particulates are in contact with one another.

In some embodiments, the steps of introducing the pad fluid, introducing the treatment fluid, placing the CPPs and BPPs in the fracture, reducing the hydraulic pressure to form the crushed-proppant pack in the bottom portion of the fracture with the CPPs and the proppant pack in the top portion of the fracture with the BPPs may be repeated at at least a second treatment interval in the subterranean formation. Any number of additional cycles may be repeated at more than a second treatment interval, thereby forming a plurality of fractures in the subterranean formation of interest, each having an arch channel formed therein.

In some embodiments, the present disclosure may provide for the formation of a proppant pack in the top portion of the fracture with the BPPs after fracture closure occurs. In some embodiments, the proppant pack formed with the BPPs may encompass the entire length of the fracture from the topmost portion of the arch channel to the tip of the top of the fracture. In other embodiments, the quantity of the BPPs may become progressively smaller as the top of the fracture is approached. That is, a proppant pack with the BPPs may be located at the topmost portion of the arch channel, and a monolayer of the BPPs may be formed thereabove at any location approaching the tip of the top of the fracture. As used herein, the term "monolayer" refers to a type of proppant pack in which the proppant particulates are in a single, filled layer, are in contact with one another, and wherein the separation between any one point of the fracture faces may be less than, or about the same, as the largest exterior dimension of any one of the particulates. In yet other embodiments, a proppant pack with the BPPs may be located at the topmost portion of the arch channel, a monolayer of the BPPs may be formed thereabove, followed by a partial monolayer of the BPPs formed above the monolayer, without departing from the scope of the present disclosure. As described herein, the term "partial monolayer" refers to a type of proppant pack in which the proppant particulates are in a single layer, are not generally in contact with one another, and wherein the separation between any one point of the fracture faces may be less than, or about the same, as the largest exterior dimension of any one of the particulates.

In some embodiments, the gradation of proppant pack types formed in the fracture with the BPPs may be controlled by use of varying degrees of buoyant BPPs. That is, some of the BPPs may be less dense than others. For example, two buoyancy levels of the BPPs may be elected such that a portion of the BPPs are more dense, and a portion is less dense. In such instances, the more dense:less dense ratio of the BPPs may be in a range of a lower limit of about 1:10, 1.5:10, 2:10, 2.5:10, 3:10, 3.5:10, 4:10, 4.5:10, and 5:10 to an upper limit of about 10:1, 9.5:10, 9:10, 8.5:10, 8:10, 7.5:10, 7:10, 6.5:10, 6:10, 5.5:10, and 5:10, encompassing every value and subset therebetween. In other embodiments, three buoyancy levels of the BPPs may be selected such that a portion of the BPPs are most dense, another portion is less dense, and the final portion is least dense. In some instances, the more dense:less dense:least dense BPPs may be in ratio such as, but not limited to, about 5:3:1.

In some embodiments, the CPPs may be coated with a consolidating agent to facilitate the formation of the crushed-proppant pack by holding the settled CPPs in place prior to fracture closure and thereafter. In yet other embodiments, a consolidating agent may be included in the pad fluid, where the consolidating agent coats a face of the fracture to form a tacky film thereon (at least for a period of time). By forming the tacky film, the settled CPPs are anchored to the bottom portion of the fracture and the neutrally buoyant suspended BPPs are anchored to the top portion of the fracture, further facilitating the formation of the arch channel and the permeability of the proppant pack (and/or monolayer, and/or partial monolayer) formed by the BPPs.

Figure 1B:
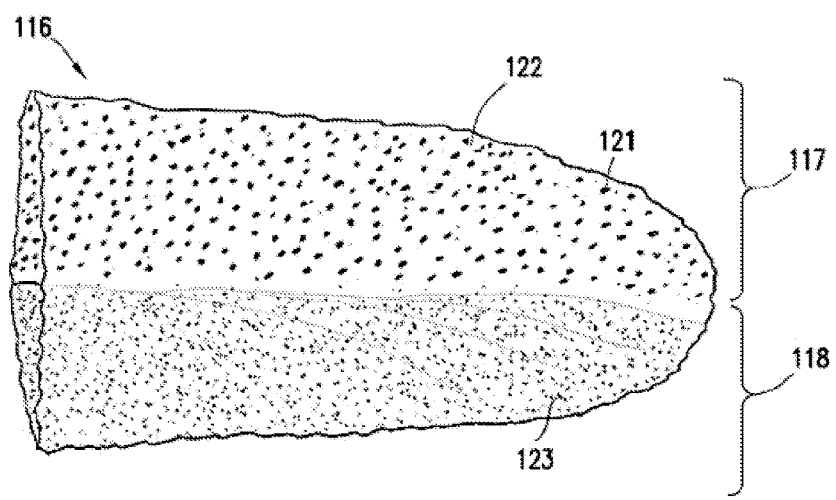

Referring now to FIGS. 1A and 1B, illustrated are side views of a fracture employing one or more embodiments of the present disclosure after fracture closure. As shown, the fracture 116 has a top portion 117 and a bottom portion 118. The fracture may also include a middle portion (not shown), as well as other portions not specifically disclosed. The top portion 117 and the bottom portion 118 of the fracture may not have the same dimensions or area, without departing from the scope of the present disclosure, and may depend on formation geometry, fracture geometry, and the like. By way of non-limiting example, the height of the bottom portion 118 may be greater than the height of the top portion 117. Moreover, the length of the bottom portion 118 and the top portion 117 may be the same or different, without departing from the scope of the present disclosure. It should also be understood that the relative terms "bottom" and "top" (as well as bottommost and topmost) are used herein for convenience and are defined as the bottom portion being located farther away from the earth's surface compared to the top portion.

With reference to FIG. 1A, initially, a treatment fluid 122 is introduced into the fracture 116 having CPPs 123 (FIG. 1B) and BPPs 121 (FIG. 1B) comingled in slurry form. Referring now to FIG. 1B, upon placement of the treatment fluid 122 into the fracture 116, as shown, the CPPs 123 settle to the bottom portion 118 of the fracture 116 and the BPPs 121 neutrally suspend in the treatment fluid 122 in the top portion 117 of the fracture 116, thus creating a distinct separation between the two types of proppant particulates. An area having substantially no BPPs 121 and no CPPs 123 is formed in the space therebetween.

Figure 2:
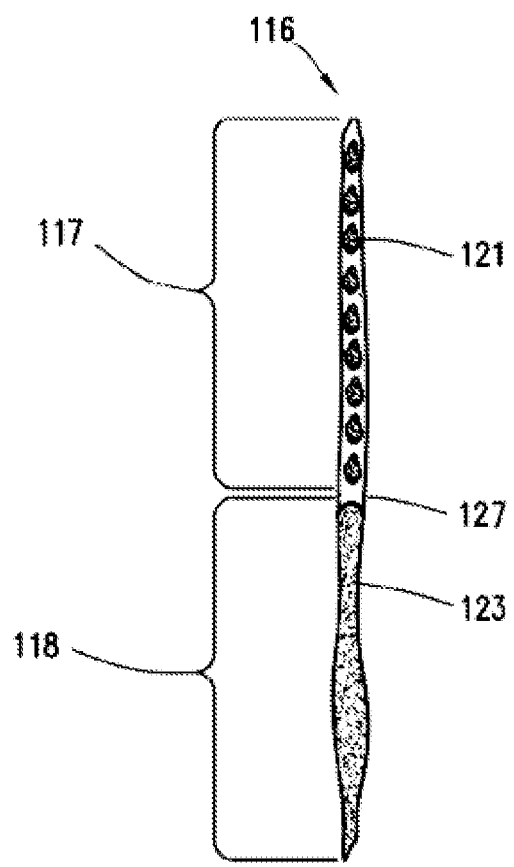
FIG. 2 depicts a cross-sectional view of a fracture comprising an arch channel according to one or more embodiments of the present disclosure.

Referring now to FIG. 2, with continued reference to FIGS. 1A and 1B, illustrated is a cross-sectional view of a fracture comprising an arch channel according to one or more embodiments of the present disclosure. The fracture 116 upon closure stress forms an arch channel 127 between a crushed-proppant pack comprising CPPs 123 in the bottom portion 118 of the fracture 116, and a proppant pack, monolayer, and/or partial monolayer comprising BPPs 121 in the top portion 117 of the fracture 116. As shown, the BPPs form a dune (i.e., a mound of BPPs) forming the bottommost portion of the arch channel 127.

The CPPs and the BPPs of the present disclosure may be composed of the same or different material, provided that the CPPs possess a first specific gravity that is at least about 0.3 greater than the second specific gravity possessed by the BPPs. That is, the same material may be used to form the CPPs and the BPPs, without departing from the scope of the present disclosure, although the CPPs and the BPPs may differ for use in any particular treatment fluid. However, the present disclosure also encompasses use of CPPs and BPPs that are composed of the same material and used in the same treatment fluid according to the embodiments herein. For example, a ceramic material may be used for both the CPPs and the BPPs, but the ceramic material may made be made porous to reduce the specific gravity of the BPPs compared to the CPPs.

As previously discussed, in some embodiments, the difference between the specific gravity of the CPPs and the BPPs, or a portion thereof, may be greater than 0.3. That is, in some embodiments, the difference between the first specific gravity of the CPPs and the second specific gravity possessed by the BPPs may be greater than a lower limit of about 0.3, 0.4, 0.5, 0.6, 0.7, 0.8, 0.9, 1, 1.1, 1.2, 1.3, 1.4, and 1.5 to an upper limit of about 3, 2.9, 2.8, 2.7, 2.6, 2.5, 2.4, 2.3, 2.2, 2.1, 2, 1.9, 1.8, 1.7, 1.6, and 1.5, encompassing any value and subset therebetween. As a non-limiting example, for instance, the BPPs may have a specific gravity of 1.05 and the CPPs may have a specific gravity of 4.0, resulting in a difference of 2.95. Each of these values is critical to the embodiments of the present disclosure and may depend on a number of factors including, but not limited to, the type and specific gravity of either or both of the CPPs and/or BPPs selected, the type of base fluid and any additives included therein, the type of subterranean formation, the desired separation between the CPPs and the BPPs, and the like.

Suitable CPPs and BPPs may be any material, naturally-occurring or man-made, suitable for use in a subterranean formation and appropriate for use in the embodiments as described herein. Suitable CPPs and BPPs for use in the embodiments of the present disclosure may include, but are not limited to, sand (e.g., desert sand, beach sand), low-quality sand (defined as proppant exhibiting more than 10% crush resistance at a closure stress of less than 5000 psi, cementitious material (e.g., Portland cement, Portland cement blends (e.g., blast-furnace slag), and non-Portland cement (e.g., super-sulfated cement, calcium aluminate cement, high magnesium-content cement, and the like), and the like, cementitious material with an expandable agent (e.g., cementitious material with an expandable agent such as calcium oxide, magnesium oxide, and the like), bauxite, alumino-silicate material, ceramic material (e.g., ceramic microspheres), glass material, polymeric material (e.g., ethylene-vinyl acetate or composite materials), metal (e.g., alkali metals, alkaline earth metals, transition metals, post-transition metals, metalloids), zeolites, polytetrafluoroethylene material, thermoplastic material (e.g., nylon thermoplastic) nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, nanoparticulates, and any combination thereof. Other suitable composite material may be a composite of nylon thermoplastic material and nano-particles. As mentioned previously, other materials may be used provided that the specific gravity difference between the CPPs and the BPPs is accommodated according to the embodiments herein, without departing from the present disclosure.

Generally, the BPPs of the present disclosure have a specific gravity of less than about 2.2, encompassing any value and subset therebetween. In some embodiments, the BPPs may have a specific gravity in the range of a lower limit of about 1.05, 1.1, 1.15, 1.2, 1.25, 1.3, 1.35, 1.4, 1.45, 1.5, 1.55, 1.6, and 1.65 to an upper limit of about 2.2, 2.15, 2.1, 2, 1.95, 1.9, 1.85, 1.8, 1.75, 1.7, and 1.65, encompassing any value and subset therebetween. Each of these values is critical to the embodiments of the present disclosure and may depend on a number of factors including, but not limited to, the type of BPPs and CPPs selected, the desired separation of the BPPs and CPPs, the type of treatment fluid and any additives therein, and the like. For example, in some embodiments, the selected BPP material may be a nylon thermoplastic/nanoparticle composite and the specific gravity thereof may be about 1.1. Suitable commercially available BPPs for use in the embodiments of the present disclosure may include, but are not limited to MONO-PROP®, a lightweight proppant, available from Halliburton Energy Services, Inc. in Houston, Tex. (specific gravity of about 1.08, and FRACBLACK HT™, an ultra-lightweight proppant (specific gravity of 1.05 to 1.08), available from Sun Drilling Products Corporation in Belle Chasse, La.

The CPPs are generally selected such that they will experience crush upon closure of a fracture in the embodiments of the present disclosure. The crushing of the CPPs upon fracture closure reduces the permeability of produced fluids through the crushed-proppant pack, but advantageously provides structural integrity to the fracture, such that the BPPs remain in the top portion of the fracture and the arch channel is formed upon encountering the closure stress. Accordingly, although the bottom portion of the fracture exhibits a lower permeability, the middle and top portion of the fracture exhibits a higher permeability due to the presence of the CPPs in the bottom portion.

The crush resistance of particulates, such as the CPPs described herein, is measured as a percentage of broken particles or fines of a particulate sample at a given closure stress according to API RP 19C:2008. The CPPs of the present disclosure are selected to have a crush resistance that is greater than about 5% at bottomhole temperature and closure stress of a particular subterranean formation.

Accordingly, the CPPs of the present disclosure are selected to fail (i.e., crush) by design to accommodate the embodiments described herein. In some embodiments, the CPPs of the present disclosure are selected to have an even higher crush resistance, such that it is in the range of a lower limit of about 5%, 7.5%, 10%, 12.5%, 15%, 17.5%, 20%, 22.5%, 25%, 27.5%, 30%, 32.5%, and 35% to an upper limit of about 60%, 57.5%, 55%, 52.5%, 50%, 47.5%, 45%, 42.5%, 40%, 37.5%, and 35%, encompassing any value and subset therebetween. Each of these values is critical to the embodiments of the present disclosure and the selected crush resistance of the CPPs may be dependent on a number of factors including, but not limited to, the size and shape of the CPPs (e.g., how much crushing is necessary to at least partially fill interstitial spaces), the closure stress of the subterranean formation, the crush resistance of the BPPs, and the like.

In some embodiments, and as depicted in FIGS. 1A, 1B, and 2, the size of the CPPs may generally be smaller than the size of the BPPs. Such a configuration may aid in formation of the crushed-proppant pack with the CPPs and/or the formation of the proppant pack, monolayer, and/or partial monolayer with the BPPs, thus enhancing the conductivity or conductive life of a fracture. That is, a smaller size of CPPs may aid in forming a tight crushed-proppant pack capable of withstanding the closure stress of the fracture and advantageously provide structural integrity to the fracture, such that the BPPs remain in the top portion of the fracture and the arch channel is formed upon encountering the closure stress. Similarly, the larger size of the BPPs may facilitate the formation of larger conductive channels between the interstitial spaces in the proppant pack, monolayer, and/or the partial monolayer at the top of the fracture.

In some embodiments, the CPPs of the present disclosure may have a particle size distribution such that they are sized in the range of from a lower limit of about 400 mesh, 380 mesh, 360 mesh, 340 mesh, 320 mesh, 300 mesh, 280 mesh, 260 mesh, 240 mesh, 220 mesh, 200 mesh, 180 mesh, 160 mesh, and 140 mesh to an upper limit of about 10 mesh, 20 mesh, 40 mesh, 60 mesh, 80 mesh, 100 mesh, 120 mesh, and 140 mesh U.S. Standard Sieve, encompassing any value and subset therebetween. Each of these values is critical to the embodiments of the present disclosure and may depend on a number of factors including, but not limited to, the desired crush resistance, the type of CPP selected, the closure stress of the fracture, the type of BPP selected, and the like.

The BPPs may have a first particle size distribution relative to a second particle size distribution of the CPPs, such that the BPPs have a particle size distribution that is narrower than that of the CPPs. That is, the particle size distribution width, defined as the difference between the d95 and d05 distribution metrics, is less than the distribution width of the CPPs. Such a narrower BPP distribution favors building better conductivity in the upper portion of the fracture. In some embodiments, the BPPs of the present disclosure are selected to have a particle size distribution width that is less than about 50% of the particle size distribution width of the CPPs.

In some embodiments, the CPPs may be present in the treatment fluids of the present disclosure in an amount in the range of from a lower limit of about 0.5 pounds per gallon (ppg), 1 ppg, 2 ppg, 3 ppg, 4 ppg, 5 ppg, 6 ppg, 7 ppg, 8 ppg, 9 ppg, 10 ppg, 11 ppg, and 12 ppg to an upper limit of about 25 ppg, 24 ppg, 23 ppg, 22 ppg, 21 ppg, 20 ppg, 19 ppg, 18 ppg, 17 ppg, 16 ppg, 15v14 ppg, 13 ppg, and 12 ppg of the base fluid in the treatment fluid (equivalent to about 60 grams per liter (g/L) to about 3000 g/L), encompassing any value and subset therebetween. Each of these values is critical to the embodiments of the present disclosure and may depend on a number of factors including, but not limited to, the type and size of CPPs selected, the crush strength of the CPPs, the type and geometry of the subterranean formation and fracture, the desired permeability of the crushed-proppant pack, and the like.

In some embodiments, the BPPs may be present in the treatment fluids of the present disclosure in an amount in the range of from a lower limit of about 0.2 ppg, 0.4 ppg, 0.6 ppg, 0.8 ppg, 1 ppg, 1.2 ppg, 1.4 ppg, 1.6 ppg, 1.8 ppg, 2 ppg, 2.2 ppg, 2.4 ppg, and 2.6 ppg to an upper limit of about 5 ppg, 4.8 ppg, 4.6 ppg, 4.4 ppg, 4.2 ppg, 4 ppg, 3.8 ppg, 3.6 ppg, 3.4 ppg, 3.2 ppg, 3 ppg, 2.8 ppg, and 2.6 ppg of the base fluid in the treatment fluid (equivalent to about 24 g/L to about 600 g/L), encompassing every value and subset therebetween. Each of these values is critical to the embodiments of the present disclosure and may depend on a number of factors including, but not limited to, the type and size of BPPs selected, the crush strength of the CPPs, the type and geometry of the subterranean formation and fracture, the desired permeability of the proppant pack formed with the BPPs, and the like.

As apparent, in some embodiments, the BPPs may generally be present in a lesser concentration than the CPPs, although an equal concentration of the two proppant particulate types may be employed, without departing from the scope of the present disclosure. As provided with reference to the criticality of the concentration ranges of the CPPs and the BPPs, a number of factors influence the amount of CPPs and BPPs included in a treatment fluid for use in the embodiments of the present disclosure.

The treatment fluid and the pad fluid of the present disclosure (collectively referred to simply as "fluids," unless otherwise specifically stated) may comprise a base fluid (i.e., a first base fluid (or third or fourth base fluid) and a second base fluid, respectively). The base fluid for use in the treatment fluid (including when multiple treatment fluids are used to introduce the CPPs and BPPs separately into a formation) and/or the pad fluid may be the same base fluid or a different base fluid, without departing from the scope of the present disclosure. Suitable base fluids for use in conjunction with embodiments of the present disclosure may include, but not be limited to, oil base fluids, aqueous base fluids, aqueous-miscible base fluids, water-in-oil emulsion base fluids, oil-in-water emulsion base fluids, and any combination thereof. In some embodiments, the base fluid for use in forming the treatment fluids described herein may be a slickwater aqueous base fluid. As described herein, the term "slickwater," and grammatical variants thereof (e.g., "slickwater aqueous base fluid), refers to water or a salt solution containing a small amount of friction reducing polymer (e.g., polyacrylamide) which does not significantly enhance viscosity compared to traditional viscosifying agents (e.g., guar). Accordingly, such slickwater aqueous base fluids are characterized by a low viscosity.

Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous base fluids may include, but are not limited to, fresh water, saltwater (e.g., water containing one or more salts dissolved therein), brine (e.g., saturated salt water), seawater, produced water (e.g., water produced as a byproduct along with oil and gas), treated or untreated wastewater (e.g., water that has been adversely affected in quality by anthropogenic influence), and any combination thereof.

Suitable aqueous-miscible base fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid, and any combination thereof.

Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. Suitable oil-in-water emulsion base fluids may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. It should be noted that for water-in-oil and oil-in-water emulsions, any mixture of the above may be used including the water being and/or comprising an aqueous-miscible base fluid.

In some embodiments, the pad fluid may be a slickwater or non-viscosified fluid (i.e., a linear gel). However, in other embodiments, the pad fluid may be viscosified and comprise a gelling agent, which may reduce friction, control leakoff due to build pressure sufficient to fracture a subterranean formation, and the like. The gelling agents for use in the pad fluids of the present disclosure may increase the viscosity thereof to a viscosity in the range of a lower limit of about 10 centipoise (cP), 50 cP, 100 cP, 250 cP, 500 cP, 750 cP, 1000 cP, 1250 cP, 1500 cP, 1750 cP, 2000 cP, 2250 cP, and 2500 cP to an upper limit of about 5000 cP, 4750 cP, 4500 cP, 4250 cP, 4000 cP, 3750 cP, 3500 cP, 3250 cP, 3000 cP, 2750 cP, and 2500 cP, encompassing every value and subset therebetween. Each of these values is critical to the embodiments of the present disclosure and may depend on a number of factors including, but not limited to, the necessary fracturing pressure, the required friction reducing capacity, and the like. In some embodiments, as stated below, the pad fluid comprising the gelling agents may further include a friction reducer, a crosslinking agent, and any combination thereof. Suitable gelling agents may include, but are not limited to, natural polymers, synthetic polymers, and any combination thereof. Oligomers, including those listed herein, capable of associating to form higher viscosity networks may also be used as the gelling agents herein, without departing from the scope of the present disclosure.

Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and any combination thereof. In certain embodiments, the gelling agent may comprise an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the pad fluids described herein in an amount in the range of from a lower limit of about 0.01%, 0.05%, 0.1%, 0.15%, 0.2%, 0.25%, 0.3%, 0.35%, 0.4%, 0.45%, 0.5%, 0.55%, 0.6%, 0.65%, 0.7%, and 0.75% to an upper limit of about 1.5%, 1.45%, 1.4%, 1.35%, 1.3%, 1.25%, 1.2%, 1.15%, 1.1%, 1.05%, 1%, 0.95%, 0.9v0.85%, 0.8%, and 0.75% weight per volume (w/v) of the base fluid of the pad fluid, encompassing any value and subset therebetween. Each of these values is critical to the performance of the methods described herein, where amount of gelling agent may be dependent on the type of base fluid selected, the desired fluid loss control efficiency, bottomhole temperatures, and the like.

In some embodiments, it may be desirable to crosslink the gelling agent and the pad fluids may further comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In certain embodiments, the crosslinking agent may be formulated to remain inactive until it is "activated" by, among other things, certain conditions in the pad fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place, or by frangibility of the encapsulating material such that the crosslinking agent is released upon encountering a stress (e.g., removal of hydraulic pressure and fracture closure).

The encapsulating material may be any material capable of delaying the action of the crosslinking agent including, but not limited to, a wax, polyvinyl alcohol, a polymer, a protein, a polysaccharide, a degradable material, or any combination thereof. Examples of such encapsulating materials may include, but are not limited to, polylactic acid, polyglycolic acid, a polyamide, a polyalkylene glycol (e.g., polyethylene glycol), polyvinyl alcohol, polyvinyl ester, polysiloxane, polyurethane, polyurethane copolymers, polyacrylic acid, a polyacrylic acid derivative, collagen, gelatin, a cellulose derivative (e.g., alkyl cellulose, hydroxyalkyl cellulose, cellulose acetate, and the like), and any combination thereof.

The choice of a particular crosslinking agent may be governed by several considerations including, but not limited, the type of gelling agent included, the molecular weight of the gelling agent(s), the conditions in the subterranean formation being treated, the safety handling requirements, the pH of the pad fluid, temperature, and/or the desired delay for the crosslinking agent to crosslink the gelling agent molecules. When included, suitable crosslinking agents may be present in the pad fluids in an amount sufficient to provide the desired degree of crosslinking between molecules of the gelling agent. In certain embodiments, the crosslinking agent may be present in the pad fluids in an amount in the range of from a lower limit of about 0.001%, 0.005%, 0.01%, 0.02%, 0.03%, 0.04%, 0.05%, 0.06%, 0.07%, 0.08%, 0.09%, and 0.1% to an upper limit of about 0.2%, 0.19%, 0.18%, 0.17%, 0.16%, 0.15%, 0.14%, 0.13%, 0.12%, 0.11%, and 0.1% w/v of the base fluid of the pad fluid, encompassing any value and subset therebetween. Each of these values is critical to the performance of the methods described herein, where amount of crosslinking agent may depend on a number of factors including, but not limited to, the amount and type of gelling agent, the type of base fluid selected, the desired viscosity, and the like.

As described above, a consolidating agent may be included in the pad fluid for coating onto a face of the fracture in the subterranean formation according to the embodiments of the present disclosure, or may be coated onto the CPPs for use in forming the CPP crushed-proppant pack described herein. When the CPPs are coated with the consolidating agent, they may be pre-coated onto the CPPs prior to their introduction into the treatment fluid and/or the subterranean formation. That is, the consolidating agent may be coated onto the CPPs prior to placing them in the treatment fluid (e.g., for storage outside of the treatment fluid), or may be coated onto the CPPs by including the consolidating in the treatment fluid prior to its introduction into the subterranean formation, in which through natural or induced mixing, the consolidating agent coats onto the surface of the CPPs. In other embodiments, as described in detail below, the CPPs and BPPs may be separately introduced into a subterranean formation fracture using two different treatment fluids. In such instances, the CPPs may be coated with the consolidating agents on-the-fly in the treatment fluid comprising the CPPs. As used herein, the term "on-the-fly" refers to performing an operation during a subterranean treatment that does not require stopping normal operations. Accordingly, the treatment fluid comprising the CPPs and the consolidating agent may be introduced simultaneously into the subterranean formation to form the coated CPPs. As used herein, the term "coating the CPPs" (e.g., "coating the CPPs with a consolidating agent"), and grammatical variants thereof, means that at least about 50% (or at least about 60%, 70%, 80%, 90%, or 100%) of the outer surface of the CPPs are coated. Similarly, as used herein, the term "coating a face" (e.g., "coating a face of a formation," or "coating a face of a fracture"), and grammatical variants thereof, means that at least about 50% (or at least about 60%, 70%, 80%, 90%, or 100%) of the outer surface of the formation or fracture face contacted with the coating material (e.g., a consolidating agent) are coated.

Suitable consolidation agents may include, but are not limited to, a non-aqueous tackifying agent, an aqueous tackifying agent, a silyl-modified polyamide compound, a curable resin, a crosslinkable aqueous polymer composition, a polymerizable organic monomer composition, a zeta potential-modifying aggregating composition, a silicon-based resin, a binder, a consolidating agent emulsion, and any combination thereof. Such combinations may include, for example, use of a non-curable consolidating agent (e.g., one that does not cure into a solid, hardened mass) and/or a curable consolidating agent to aid in formation of the CPP crushed-proppant pack, the BPP proppant pack (and/or monolayer, and/or partial monolayer), and the arch channel of the embodiments described herein, as previously discussed.

Non-aqueous tackifying agents suitable for use in the embodiments disclosed herein may be used such that they cure to form a non-hardened coating, or may be combined with a multifunctional material capable of reacting with the non-aqueous tackifying compound to cure to form a hardened coating. As used herein, the term "cure" and grammatical variants thereof (e.g., "curing") refers to substantially non-flowable reaction product, such as through the process of cross-linking chemical reactions of the consolidating agent. A "hardened coating" as used herein means that the reaction of the non-aqueous tackifying agent with the multifunctional material will result in a substantially non-flowable reaction product that exhibits a higher compressive strength in a consolidated agglomerate than the non-aqueous tackifying agent alone. In this instance, the non-aqueous tackifying agent may function similarly to a curable resin.

For use in the embodiments described herein, the non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde), a dialdehyde (e.g., glutaraldehyde, hemiacetals or aldehyde releasing compounds), a diacid halide, a dihalide (e.g., dichlorides and dibromides), a polyacid anhydride (e.g., citric acid, epoxides, furfuraldehyde, glutaraldehyde or aldehyde condensates), and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent, encompassing any value and subset therebetween. In other embodiments, the multifunctional material may be mixed with the non-aqueous tackifying agent in an amount of from about 0.5% to about 1% by weight of the non-aqueous tackifying agent.

Aqueous tackifying agents suitable for use in the embodiments of the present disclosure are usually not generally significantly tacky when placed onto a surface (e.g., a face of a formation or fracture, or an outer surface of a CPP), but are capable of being "activated" (e.g., destabilized, coalesced and/or reacted) to transform the compound into a sticky, tacky compound at a desirable time. This may permit an operator to design time-based CPPs that exhibit certain qualities (e.g., tackiness) only after activation. As used herein, the term "tacky," and all grammatical variants thereof, refers to a substance having a nature such that it is somewhat sticky to the touch and capable of being applied to a solid surface. In some embodiments, a pretreatment may be first contacted with a surface to prepare it to be coated with an aqueous tackifying agent. Suitable aqueous tackifying agents may be charged polymers that comprise compounds that, when in a fluid, will form a non-hardening coating (by itself or with an activator). The aqueous tackifying agent may enhance the grain-to-grain contact between individual CPPs within the fracture, helping agglomerate the CPPs for use in forming the crushed-proppant pack described herein.

Polymers that function as pressure-sensitive adhesives may also be suitable as the consolidating agent described herein. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester co-polymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% $C_1$-$C_{30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Resins suitable for use as a consolidating agent of the embodiments of the present disclosure may include any resin capable of forming a hardened, consolidated mass upon curing. Examples of suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

Some suitable resins, such as epoxy resins, may be cured with an internal catalyst or activator so that when pumped downhole, they may be cured using time and temperature. Other suitable resins, such as furan resins generally require a time-delayed catalyst or an external catalyst to help activate the polymerization of the resins if the cure temperature is low (i.e., less than about 121° C. (about 250° F.), but will cure under the effect of time and temperature, as well as a subterranean formation having a formation temperature above about 121° C. (about 250° F.), preferably above about 149° C. (about 300° F.). It is within the ability of one skilled in the art, with the benefit of this disclosure, to select a suitable resin for use in embodiments of the present disclosure and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the embodiments of the present disclosure, such as to prepare the resin to coat a surface. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other solvents may include, but are not limited to, aqueous dissolvable solvents such as, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on at least the resin composition chosen.

Suitable silyl-modified polyamide compounds that may be used as a consolidating agent in the embodiments of the present disclosure are those that are substantially self-hardening compositions capable of at least partially adhering to a surface in an unhardened state, and that are further capable of self-hardening into a substantially non-tacky state. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In other embodiments, the consolidating agent may comprise crosslinkable aqueous polymer compositions. Generally, suitable crosslinkable aqueous polymer compositions comprise an aqueous solvent, a crosslinkable polymer, and a crosslinker. The aqueous solvent may be any aqueous solvent in which the crosslinkable composition and the crosslinker may be dissolved, mixed, suspended, or dispersed to facilitate gel formation. For example, the aqueous solvent used may be freshwater, salt water, brine, seawater, or any other aqueous liquid that does not adversely react with the other components used in accordance with this disclosure or with a subterranean formation, including the aqueous base fluids described above.

Examples of crosslinkable aqueous polymer compositions for use as the consolidating agents described herein may include, but are not limited to, carboxylate-containing polymers and acrylamide-containing polymers. The most suitable polymers are thought to be those that would absorb or adhere to a surface (e.g., a face of a formation/fracture, or a surface of a CPP). Examples of suitable acrylamide-containing polymers may include, but are not limited to, polyacrylamide, partially hydrolyzed polyacrylamide, copolymers of acrylamide and acrylate, carboxylate-containing terpolymers, tetrapolymers of acrylate, and any combination thereof. Additional examples of suitable crosslinkable aqueous polymers may include, but are not limited to, hydratable polymers comprising polysaccharides and derivatives thereof, and that contain one or more of the monosaccharide units: galactose, mannose, glucoside, glucose, xylose, arabinose, fructose, glucuronic acid, or pyranosyl sulfate. Suitable natural hydratable polymers may include, but are not limited to, guar gum, locust bean gum, tara gum, konjak, tamarind, starch, cellulose, karaya, xanthan, tragacanth, and carrageenan, any derivative thereof, and any combination thereof.

Suitable hydratable synthetic polymers and copolymers that may be used as the crosslinkable aqueous polymer compositions may include, but are not limited to, polycarboxylates (e.g., polyacrylates and polymethacrylates), polyacrylamides, methylvinyl ether polymers, polyvinyl alcohols, polyvinylpyrrolidone, any derivative thereof, and any combination thereof. The crosslinkable polymer used should be included in the crosslinkable aqueous polymer composition in an amount sufficient to form the desired gelled substance for coating onto a surface. In some embodiments, the crosslinkable polymer may be included in the crosslinkable aqueous polymer composition in an amount in the range of from a lower limit of about 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by weight of the aqueous solvent, encompassing any value and subset therebetween. In another embodiment, the crosslinkable polymer may be included in the crosslinkable aqueous polymer composition in an amount in the range of from about 1% to about 20% by weight of the aqueous solvent.

The crosslinkable aqueous polymer compositions of the embodiments described herein further comprise a crosslinker for crosslinking the crosslinkable polymers to form the desired gelled substance for coating onto a surface. In some embodiments, the crosslinker is a molecule or complex containing a reactive transition metal cation. In some embodiments, the crosslinker may comprise trivalent chromium cations complexed or bonded to anions, atomic oxygen, or water. Examples of suitable crosslinkers may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinkers may also be suitable.

The crosslinker may be present in the crosslinkable aqueous polymer compositions of the embodiments of the present disclosure in an amount sufficient to provide, among other things, the desired degree of crosslinking. In some embodiments, the crosslinker may be present in the crosslinkable aqueous polymer compositions in an amount in the range of from a lower limit of about 0.01%, 0.025%, 0.05%, 0.075%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by weight of the crosslinkable aqueous polymer composition, encompassing any value and subset therebetween. The exact type and amount of crosslinker(s) used may depend upon the specific crosslinkable polymer to be crosslinked, formation conditions, if crosslinked downhole, and the like.

Optionally, the crosslinkable aqueous polymer compositions may further comprise a crosslinking delaying agent, such as a polysaccharide crosslinking delaying agent derived from guar, guar derivatives, cellulose derivatives, or combinations thereof. The crosslinking delaying agent may be included in the crosslinkable aqueous polymer compositions, among other things, to delay crosslinking of the crosslinkable aqueous polymer compositions until desired (e.g., to control the timing of the curing of the consolidating agent coated onto a face of the formation/fracture or the CPPs).

In other embodiments, the consolidating agent may comprise polymerizable organic monomer compositions. Generally, suitable polymerizable organic monomer compositions comprise an aqueous fluid, a water-soluble polymerizable organic monomer, an oxygen scavenger, and a primary initiator. The aqueous fluid component of the polymerizable organic monomer composition generally may be freshwater, salt water, brine, seawater, or any other aqueous liquid that does not adversely react with the other components used in accordance with this disclosure, including those provided as part of the aqueous base fluid described herein.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxymethylacrylate, hydroxyethylmethacrylate, N-hydroxymethylacrylamide, N-hydroxymethyl-methacrylamide, polyethylene amine, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid.

The water-soluble polymerizable organic monomer (or monomers where a combination thereof is used) should be included in the polymerizable organic monomer composition in an amount sufficient to form the desired gelled substance after placement on a surface as described herein. In some embodiments, the water-soluble polymerizable organic monomer may be included in the polymerizable organic monomer composition in an amount in the range of from a lower limit of about 1%, 2%, 4%, 6%, 8%, 10%, 12%, 14%, and 16% to an upper limit of about 30%, 28%, 26%, 24%, 22%, 20%, 18%, and 16% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers, which may allow control over (e.g., delay) the curing of the polymerizable organic monomer composition. In some embodiments, an oxygen scavenger, such as stannous chloride, may be included in the polymerizable monomer composition. In order to improve the solubility of stannous chloride so that it may be readily combined with the polymerizable organic monomer composition, the stannous chloride may be pre-dissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from a lower limit of about 0.005%, 0.01%, 0.1%, 0.5%, 1%, 1.5%, 2%, 2.5%, 3%, 3.5%, 4%, and 4.5% to an upper limit about 10%, 9.5%, 9%, 8.5%, 8%, 7.5%, 7%, 6.5%, 6%, 5.5%, 5%, and 4.5% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate curing (i.e., polymerization) of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis(2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween. Of note, as the polymerization temperature increases, the required level of activator decreases.

Optionally, the polymerizable organic monomer compositions further may comprise a secondary initiator. A secondary initiator may be used, for example, where the polymerizable organic monomer composition is placed into a subterranean formation that is relatively cool as compared to the surface, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions (e.g., into a gelled substance). In some embodiments, the crosslinker may be any crosslinker capable of crosslinking the polymerizable organic monomer composition that does not adversely interfere with the embodiments described herein. Examples of suitable crosslinkers include those discussed previously with reference to crosslinkable aqueous polymer compositions. Generally, the crosslinker may be present in polymerizable organic monomer compositions in an amount in the range of from a lower limit of about 0.01%, 0.02%, 0.04%, 0.06%, 0.08%, 0.1%, 0.2%, 0.4%, 0.6%, 0.8%, 1%, 1.2%, 1.4%, 1.6%, 1.8%, and 2% to an upper limit of about 5%, 4.8%, 4.6%, 4.4%, 4.2%, 4%, 3.8%, 3.6%, 3.4%, 3.2%, 3%, 2.8%, 2.6%, 2.4%, 2.2%, and 2% by weight of the polymerizable organic monomer composition, encompassing any value and any subset therebetween.

In some embodiments, the consolidating agent may comprise a binder. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:

(I) a consolidant comprising a hydrolyzate or precondensate of:

(a) at least one organosilane of the general Formula IV:

$R_nSiX_{4-n}$            Formula IV in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general Formula V:

$SiX_4$            Formula V in which the X radicals are each as defined above, and (c) at least one metal compound of the general Formula VI:

$MX_a$            Formula VI in which M is a metal of main groups I to VIII or of transition groups II to VIII of the Periodic Table of the Elements including boron, X is as defined in Formula IV, where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the consolidating agent is cured under elevated pressure and elevated temperature, where the consolidating agent, in the case that it is used to change the wetting behavior of the formation, also comprises an oleophobic and hydrophobic component. Comprehensive investigations have shown that these consolidating agents are not decomposed even in autoclaves at high pressure and high temperature even over a prolonged period, and also still form a stable bond under these conditions. In the case of use of a wetting-regulating consolidating agent variant, it was shown that the wetting behavior established is retained after a hydrothermal treatment in corrosive medium. The consolidation also reduces the porosity only to a slight degree.

Suitable silicon-based resins for use as the consolidating agents described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and have a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof.

The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

  Formula I wherein X comprises a hydrocarbon chain; wherein x=0 to 2 and z=0 to 2; wherein R' and R" comprises hydrogen, a halogen, an amide, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R" may be the same (identical) or different; and wherein when z is 0 or 1, then each R' may be the same or different; and (b) a polysiloxane comprising a reactive functional group that comprises at least one of the following structural units of Formula II:

  Formula II wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two-step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

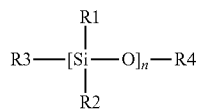  Formula III wherein, for each repeating polymer unit, R1, R2 and R3 are independently selected from the group consisting of alkyl, aryl, reactive glycidoxy groups having up to 20 carbon atoms, and OSi(OR5)3 groups, wherein each R5 independently has the same meaning as R1, R2 or R3, and R4 is either alkyl, aryl or hydrogen, and wherein n is selected such that the molecular weight of the polysiloxane is in the range of 500 to 2000; and, b) an organofunctional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used. Examples of suitable polymers may include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyltrimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris (beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, r-mercaptopropyltrimethoxysilane, r-chloropropyltrimethoxysilane, vinyltris (beta-methoxyethoxy) silane, r-metacryloxypropyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof.

In some embodiments, the silane coupling agent may be present in the silicon-based resin composition in an amount of from a lower limit of about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 0.5% to about 3% by weight of the composition, encompassing any value and any subset therebetween.

In some embodiments, the consolidating agent may comprise a zeta potential-modifying aggregating composition, which can modify the zeta potential of a surface. Such modifications can permit any two surfaces (e.g., of two or more CPPs) to have a greater attraction for one another.

Zeta potential-modifying aggregating compositions suitable for use in the embodiments of the present disclosure may include, but are not limited to, a reaction product of an amine and a phosphate ester, where the zeta potential-modifying aggregating composition is designed to coat a surface to change the zeta potential thereof.

Suitable amines may include, but are not limited to, any amine that is capable of reacting with a suitable phosphate ester to form a composition that forms a deformable coating on a surface. Exemplary examples of such amines may include, but are not limited to, any amine of the general formula $R_1, R_2NH$ or mixtures or combinations thereof, where $R_1$ and $R_2$ are independently a hydrogen atom or a carbyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof and where one or more of the hydrogen atoms can be replaced by one or more single valence atoms selected from the group consisting of fluorine, chlorine, bromine, iodine, and any combination thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixtures of alkyl indoles, imidazole and alkyl imidazole or mixtures of alkyl imidazole, quinoline and alkyl quinoline or mixtures of alkyl quinoline, isoquinoline and alkyl isoquinoline or mixtures of alkyl isoquinoline, pyrazine and alkyl pyrazine or mixtures of alkyl pyrazine, quinoxaline and alkyl quinoxaline or mixtures of alkyl quinoxaline, acridine and alkyl acridine or mixtures of alkyl acridine, pyrimidine and alkyl pyrimidine or mixtures of alkyl pyrimidine, quinazoline and alkyl quinazoline or mixtures of alkyl quinazoline, and any combination thereof.

Suitable phosphate esters may include, but are not limited to, any phosphate ester that is capable of reacting with a suitable amine to form a composition that forms a deformable coating on a surface. Exemplary examples of such phosphate esters may include, but are not limited to, any phosphate esters of the general formula $P(O)(OR_3)(OR_4)(OR_5)$ or mixtures or combinations thereof, where $R_3$, $R_4$, and $OR_5$ are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine, and any combination thereof. Exemplary examples of phosphate esters may include, but are not limited to, phosphate ester of alkanols having the general formula $P(O)(OH)_x(OR_6)_y$ where $x+y=3$ and are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates, and any combination thereof.

Other exemplary examples of phosphate esters may include, but are not limited to, phosphate esters of alkanol amines having the general formula $N[R_7OP(O)(OH)_2]_3$ where $R_7$ is a carbenyl group having between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine, and any combination thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures. Other exemplary phosphate esters may include, but are not limited to, any phosphate ester that can react with an amine and be coated on to a surface and alter its zeta potential according to the methods described herein.

In some embodiments, the consolidating agent may comprise a consolidating agent emulsion that comprises an aqueous fluid, an emulsifying agent, and a consolidating agent. The consolidating agent in suitable emulsions may be either a non-aqueous tackifying agent or a resin, such as those described above. These consolidating agent emulsions have an aqueous external phase and organic-based internal phase. The term "emulsion" and all grammatical variants thereof, as used herein, refers to a combination of two or more immiscible phases and includes, but is not limited to, dispersions and suspensions.

Suitable consolidating agent emulsions comprise an aqueous external phase comprising an aqueous fluid. Suitable aqueous fluids that may be used in the consolidating agent emulsions of the embodiments of the present disclosure include freshwater, salt water, brine, seawater, or any other aqueous fluid that, preferably, does not adversely react with the other components used in accordance with this disclosure or with the subterranean formation, including those listed above with reference to the aqueous base fluids included in the fluids described herein. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the consolidating agent emulsions of the embodiments of the present disclosure before it becomes problematic for the stability of the emulsion.

The aqueous fluid may be present in the consolidating agent emulsions in an amount in the range of from a lower limit of about 20%, 22%, 24%, 26%, 28%, 30%, 32%, 34%, 36%, 38%, 40%, 42%, 44%, 46%, 48%, 50%, 52%, 54%, 56%, 58%, and 60% to an upper limit of about 99.9%, 98%, 96%, 94%, 92%, 90%, 88%, 86%, 84%, 82%, 80%, 78%, 76%, 74%, 72%, 70%, 68%, 66%, 64%, 62%, and 60% by weight of the consolidating agent emulsion composition, encompassing any value and any subset therebetween. In some embodiments, the aqueous fluid may be present in the consolidating agent emulsions in an amount in the range of about 60% to 99.9% by weight of the consolidating agent emulsion composition. In other embodiments, the aqueous fluid may be present in the consolidating agent emulsions in an amount in the range of about 95% to 99.9% by weight of the consolidating agent emulsion composition.

The consolidating agent in the emulsion may be either a non-aqueous tackifying agent or a resin, such as those described above. The consolidating agents may be present in a consolidating agent emulsion in an amount in the range of from a lower limit of about 0.1%, 1%, 5%, 10%, 15%, 20%, 25%, 30%, 35%, and 40% to an upper limit about 80%, 75%, 70%, 65%, 60%, 55%, 50%, 45%, and 40% by weight of the consolidating agent emulsion composition, encompassing any value and any subset therebetween. In some embodiments, the consolidating agent may be present in a consolidating agent emulsion in an amount in the range of about 0.1% to about 40% by weight of the composition. In some embodiments, the consolidating agent may be present in a consolidating agent emulsion in an amount in the range of about 0.1% to about 5% by weight of the composition.

In certain embodiments, the consolidating agent emulsions may further comprise an emulsifying agent. Examples of suitable emulsifying agents may include, but are not limited to, surfactants, proteins, hydrolyzed proteins, lipids, glycolipids, and nano-sized particulates, including, but not limited to, fumed silica. Combinations of these may be suitable as well.

In some embodiments, the consolidating agent may also comprise an optional catalyst to facilitate curing. Generally, any suitable catalyst may be used with the consolidating agent described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in an amount from about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the consolidating agent, and preferably in an amount from about 1% to about 3% by weight of the composition, encompassing any value and any subset therebetween.

In some embodiments, where the consolidating agent is included in the pad fluids of the present disclosure, it may be present in an amount in the range of a lower limit if about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% volume per volume (v/v) of the base fluid in the pad fluid, encompassing any value and subset therebetween. For example, in some embodiments, the consolidating agent is present in the pad fluid in an amount in the range of from about 0.5% to about 3% v/v of the base fluid in the pad fluid. Each of these values is critical to the embodiments of the present disclosure and may depend on a number of factors including, but not limited to, the type of consolidating agent selected, the type of subterranean formation, the geometry and size of the fracture, the desired coating amount onto the face of the fracture, and the like.

In various embodiments, systems configured for delivering the pad fluids and treatment fluids (collectively referred to simply as "fluids" below) described herein to a downhole location are described. In various embodiments, the systems can comprise a pump fluidly coupled to a tubular, the tubular containing the fluids described herein. It will be appreciated that while the system described below may be used for delivering either or both of the pad fluid and/or treatment fluid, each fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

Figure 3:
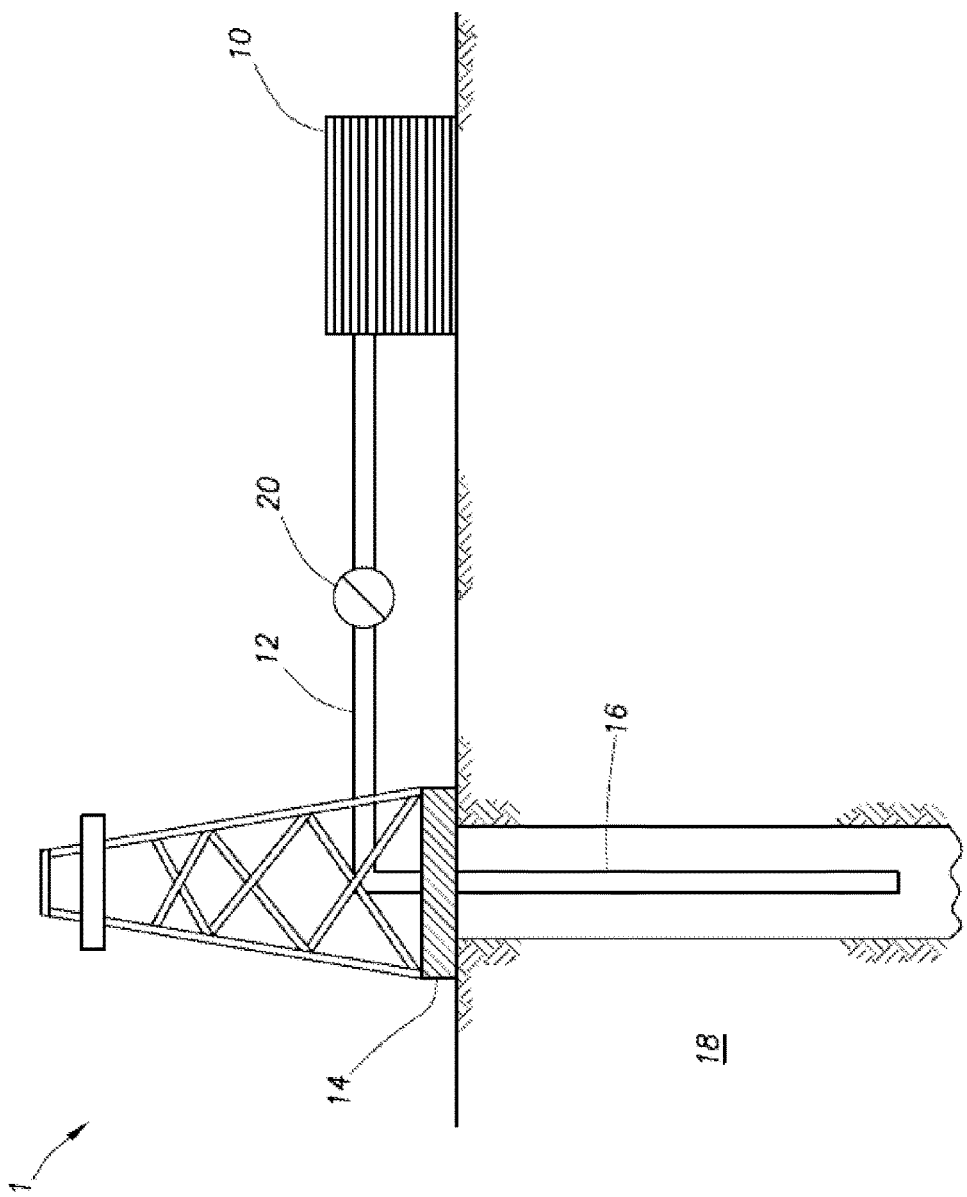
FIG. 3 depicts an embodiment of a system configured for delivering various fluids of the embodiments described herein to a downhole location.

FIG. 3 shows an illustrative schematic of a system that can deliver the fluids of the present disclosure to a downhole location, according to one or more embodiments. It should be noted that while FIG. 3 generally depicts a land-based system, it is to be recognized that like systems may be operated in subsea locations as well. As depicted in FIG. 3, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16.

The tubular 16 forming an annulus between the tubular 16 and the wellbore in the subterranean formation 18. Any one or more of the fluids described herein may accordingly be introduced through the interior of the tubular 16 or through the annulus, without departing from the scope of the present disclosure.

It is to be recognized that system 1 is merely exemplary in nature and various additional components may be present that have not necessarily been depicted in FIG. 3 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 3, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

Embodiments disclosed herein include:

Embodiment A

A method comprising: (a) introducing a pad fluid into a subterranean formation at a hydraulic pressure sufficient to create or enhance an open fracture at a first treatment interval therein, wherein the pad fluid comprises a first base fluid; (b) introducing a treatment fluid into the fracture, wherein the treatment fluid comprises a second base fluid, crushable-proppant particulates (CPPs), and buoyant-proppant particulates (BPPs), and wherein the CPPs have a first specific gravity and the BPPs have a second specific gravity, and the first specific gravity is at least about 0.3 greater than the second specific gravity; (c) placing the CPPs and the BPPs in the fracture, wherein the CPPs settle to a bottom portion of the fracture and the BPPs neutrally suspend in the treatment fluid in a top portion of the fracture; and (d) reducing the hydraulic pressure, thereby permitting the fracture to close, wherein the CPPs form a crushed-proppant pack in the bottom portion of the fracture and the BPPs form a proppant pack in the top portion of the fracture, thereby forming an arch channel therebetween.

Embodiment A may have one or more of the following additional elements in any combination:

Element A1: Wherein the second specific gravity of the BPPs is less than about 2.2.

Element A2: Wherein the second specific gravity of the BPPs is about 1.1.

Element A3: Wherein the CPPs have a particle size distribution in the range of from about 400 mesh to about 10 mesh.

Element A4: wherein the BPPs have a first particle size distribution and the CPPs have a second particle size distribution, wherein the first particle size distribution is narrower than the second particle size distribution.

Element A5: Wherein the CPPs are present in the treatment fluid in an amount in the range of from about 0.5 ppg to about 25 ppg of the second base fluid.

Element A6: Wherein the BPPs are present in the treatment fluid in an amount in the range of from about 0.2 ppg to about 5 ppg of the second base fluid.

Element A7: Wherein the CPPs have a crush resistance of greater than about 5% at bottomhole temperature and closure stress of the subterranean formation.

Element A8: Further comprising coating the CPPs with a consolidating agent.

Element A9: Wherein the pad fluid further comprising a consolidating agent, and further comprising coating a face of the fracture with the consolidating agent prior to step (b).

Element A10: Wherein the CPP crushed-proppant pack has a first permeability and the BPP proppant pack has a second permeability that is greater than the first permeability.

By way of non-limiting example, exemplary combinations applicable to A include: A with A1, A4, and A6; A with A2, A7, A8, and A10; A with A1, A2, A3, A4, A5, A6, A7, A8, A9, and A10; A with A3, A5, A7, and A10; A 1, A4, A6, A8, and A9; and the like.

Embodiment B

A method comprising: (a) introducing a pad fluid into a subterranean formation at a hydraulic pressure sufficient to create or enhance an open fracture at a first treatment interval therein, wherein the pad fluid comprises a first base fluid; (b) introducing a treatment fluid into the fracture, wherein the treatment fluid comprises a second base fluid, crushable-proppant particulates (CPPs), and buoyant-proppant particulates (BPPs), and wherein the CPPs have a first specific gravity and the BPPs have a second specific gravity, and the first specific gravity is at least about 0.3 greater than the second specific gravity; (c) placing the CPPs and the BPPs in the fracture, wherein the CPPs settle to a bottom portion of the fracture and the BPPs neutrally suspend in the treatment fluid in a top portion of the fracture; (d) reducing the hydraulic pressure, thereby permitting the fracture to close, wherein the CPPs form a crushed-proppant pack in the bottom portion of the fracture and the BPPs form a proppant pack in the top portion of the fracture, thereby forming an arch channel therebetween; and (e) repeating steps (a) through (d) at at least a second treatment interval in the subterranean formation.

Embodiment B may have one or more of the following additional elements in any combination:

Element B1: Wherein the second specific gravity of the BPPs is less than about 2.2.

Element B2: Wherein the second specific gravity of the BPPs is about 1.1.

Element B3: Wherein the CPPs have a particle size distribution in the range of from about 400 mesh to about 10 mesh.

Element B4: wherein the BPPs have a first particle size distribution and the CPPs have a second particle size distribution, wherein the first particle size distribution is narrower than the second particle size distribution.

Element B5: Wherein the CPPs are present in the treatment fluid in an amount in the range of from about 0.5 ppg to about 25 ppg of the second base fluid.

Element B6: Wherein the BPPs are present in the treatment fluid in an amount in the range of from about 0.2 ppg to about 5 ppg of the second base fluid.

Element B7: Wherein the CPPs have a crush resistance of greater than about 5% at bottomhole temperature and closure stress of the subterranean formation.

Element B8: Further comprising coating the CPPs with a consolidating agent.

Element B9: Wherein the pad fluid further comprising a consolidating agent, and further comprising coating a face of the fracture with the consolidating agent prior to step (b).

Element B10: Wherein the CPP crushed-proppant pack has a first permeability and the BPP proppant pack has a second permeability that is greater than the first permeability.

By way of non-limiting example, exemplary combinations applicable to B include: B with B1, B4, B5, and B10; B with B1, B2, B3, B4, B5, B6, B7, B8, B9, and B10; B with B2, B6, B7, and B9; B with B1, B3, B4, and B10; B with B5, B6, B7, and B8; and the like.

Embodiment C

A system comprising: a tubular extending into a wellbore in a subterranean formation, thereby forming an annulus between an exterior of the tubular and the wellbore; a pump fluidly coupled to the tubular; and either: (1) the tubular first containing a pad fluid comprising a first base fluid, and the tubular secondly containing a first treatment fluid comprising a second base fluid, crushable-proppant particulates (CPPs), and buoyant-proppant particulates (BPPs), or (2) the tubular or the annulus first containing the pad fluid, and the tubular secondly containing a second treatment fluid comprising a third base fluid and the CPPs, or a third treatment fluid comprising a fourth base fluid and the BPPs, and the annulus simultaneously containing the other of the second treatment fluid or the third treatment fluid not contained in the tubular, wherein the CPPs have a first specific gravity and the BPPs have a second specific gravity, and the first specific gravity is at least about 0.3 greater than the second specific gravity.

Embodiment C may have one or more of the following additional elements in any combination:

Element C1: Wherein the second specific gravity of the BPPs is less than about 2.2.

Element C2: Wherein the second specific gravity of the BPPs is about 1.1.

Element C3: Wherein the CPPs have a particle size distribution in the range of from about 400 mesh to about 10 mesh.

Element C4: wherein the BPPs have a first particle size distribution and the CPPs have a second particle size distribution, wherein the first particle size distribution is narrower than the second particle size distribution.

Element C5: Wherein the CPPs are present in the first treatment fluid or the second treatment fluid in an amount in the range of from about 0.5 ppg to about 25 ppg of the second base fluid or third base fluid, respectively.

Element C6: Wherein the BPPs are present in the first treatment fluid or the third treatment fluid in an amount in the range of from about 0.2 ppg to about 5 ppg of the second base fluid or the fourth base fluid, respectively.

Element C7: Wherein the CPPs have a crush resistance of greater than about 5% at bottomhole temperature and closure stress of the subterranean formation.

Element C8: Further comprising coating the CPPs with a consolidating agent.

By way of non-limiting example, exemplary combinations applicable to C include: C with C1, C5, C6, and C8; C with C2, C4, C7, and C9; C with C1, C2, C3, C4, C5, C6, C7, and C8; C with C1, C6, and C8; C with C3, C5, C6, and C8; and the like.

To facilitate a better understanding of the embodiments of the present disclosure, the following example of a representative embodiment is given. In no way should the following example be read to limit, or to define, the scope of the present disclosure.

EXAMPLE

In this example, the ability of the CPPs and BPPs according to the embodiments herein was tested under non-closure stress conditions for their separation qualities in a treatment fluid. A treatment fluid was prepared using slickwater prepared with 1% v/v of an anionic friction reducer and 3% w/v KCl brine (base fluid), 2 pounds per gallon (lbm/gal) 40/70-mesh sand (CPPs), and 1 lbm/gal FRACBLACK HT™ (BPPs). The treatment fluid was mixed to form a uniform suspension of the CPPs and BPPs in the base fluid, and then placed in a 10 milliliter (mL) graduated cylinder. The treatment fluid was allowed to settle in the graduated cylinder for 5 minutes. After that time, the treatment fluid was visually observed and the CPPs uniformly settled to the bottom portion of the graduated cylinder and the BPPs uniformly neutrally suspended in the top portion. Additionally, an area free of particulates was observed in the space between the BPPs and CPPs, which forms the arch channel upon exposure to fracture closure stresses.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    (a) introducing a pad fluid into a subterranean formation at a hydraulic pressure sufficient to create or enhance an open fracture at a first treatment interval therein, wherein the pad fluid comprises a first base fluid;
    (b) introducing a treatment fluid into the fracture, wherein the treatment fluid comprises a second base fluid, crushable-proppant particulates (CPPs), and buoyant-proppant particulates (BPPs), and wherein the CPPs have a first specific gravity and the BPPs have a second specific gravity, and the first specific gravity is at least about 0.3 greater than the second specific gravity;
    (c) placing the CPPs and the BPPs in the fracture, wherein the CPPs settle to a bottom portion of the fracture and the BPPs neutrally suspend in the treatment fluid in a top portion of the fracture; and
    (d) reducing the hydraulic pressure, thereby permitting the fracture to close, wherein the CPPs form a crushed-proppant pack in the bottom portion of the fracture and the BPPs form a proppant pack in the top portion of the fracture, thereby forming an arch channel therebetween.

2. The method of claim 1, wherein the second specific gravity of the BPPs is less than about 2.2.

3. The method of claim 1, wherein the second specific gravity of the BPPs is about 1.1.

4. The method of claim 1, wherein the CPPs have a particle size distribution in the range of from about 400 mesh to about 10 mesh.

5. The method of claim 1, wherein the BPPs have a first particle size distribution and the CPPs have a second particle size distribution, wherein the first particle size distribution is narrower than the second particle size distribution.

6. The method of claim 1, wherein the CPPs are present in the treatment fluid in an amount in the range of from about 0.5 ppg to about 25 ppg of the second base fluid.

7. The method of claim 1, wherein the BPPs are present in the treatment fluid in an amount in the range of from about 0.2 ppg to about 5 ppg of the second base fluid.

8. The method of claim 1, wherein the CPPs have a crush resistance of greater than about 5% at bottomhole temperature and closure stress of the subterranean formation.

9. The method of claim 1, further comprising coating the CPPs with a consolidating agent.

10. The method of claim 1, wherein the pad fluid further comprising a consolidating agent, and further comprising coating a face of the fracture with the consolidating agent prior to step (b).

11. The method of claim 1, wherein the CPP crushed-proppant pack has a first permeability and the BPP proppant pack has a second permeability that is greater than the first permeability.

12. A method comprising:
    (a) introducing a pad fluid into a subterranean formation at a hydraulic pressure sufficient to create or enhance an open fracture at a first treatment interval therein, wherein the pad fluid comprises a first base fluid;
    (b) introducing a treatment fluid into the fracture, wherein the treatment fluid comprises a second base fluid, crushable-proppant particulates (CPPs), and buoyant-proppant particulates (BPPs), and wherein the CPPs have a first specific gravity and the BPPs have a second specific gravity, and the first specific gravity is at least about 0.3 greater than the second specific gravity;
    (c) placing the CPPs and the BPPs in the fracture, wherein the CPPs settle to a bottom portion of the fracture and the BPPs neutrally suspend in the treatment fluid in a top portion of the fracture;
    (d) reducing the hydraulic pressure, thereby permitting the fracture to close, wherein the CPPs form a crushed-proppant pack in the bottom portion of the fracture and the BPPs form a proppant pack in the top portion of the fracture, thereby forming an arch channel therebetween; and
    (e) repeating steps (a) through (d) at at least a second treatment interval in the subterranean formation.

13. The method of claim 12, wherein the second specific gravity of the BPPs is less than about 2.2.

14. The method of claim 12, wherein the second specific gravity of the BPPs is 1.1.

15. The method of claim 12, wherein the CPPs have an average particle size distribution in the range of from about 400 mesh to about 10 mesh.

16. The method of claim 12, wherein the BPPs have a first particle size distribution and the CPPs have a second particle size distribution, wherein the first particle size distribution is narrower than the second particle size distribution.

17. The method of claim 12, wherein the CPPs have a crush resistance of greater than about 5% at bottomhole temperature and closure stress of the subterranean formation.

18. The method of claim 12, further comprising coating the CPPs with a consolidating agent.

19. The method of claim 12, wherein the pad fluid further comprising a consolidating agent, and further comprising coating a face of the fracture with the consolidating agent prior to step (b).

* * * * *